United States Patent
Yamashita et al.

[11] Patent Number: 6,034,490
[45] Date of Patent: Mar. 7, 2000

[54] LIGHTING CIRCUIT FOR DISCHARGE LAMP

[75] Inventors: Masayasu Yamashita; Atsushi Toda; Hideaki Takeuchi, all of Shimizu, Japan

[73] Assignee: Koito Manufacturing Co., Ltd., Tokyo, Japan

[21] Appl. No.: 09/092,965

[22] Filed: Jun. 8, 1998

[30] Foreign Application Priority Data

Jun. 12, 1997 [JP] Japan ................................ 9-154677

[51] Int. Cl.⁷ ........................................ G05F 1/00
[52] U.S. Cl. .................. 315/310; 315/308; 315/209 R; 315/DIG. 5; 315/DIG. 7
[58] Field of Search ................................ 315/310, 307, 315/308, 291, 209 R, 243, 244, 77, 82, DIG. 5, DIG. 7

[56] References Cited

U.S. PATENT DOCUMENTS

| | | | |
|---|---|---|---|
| 3,890,537 | 6/1975 | Park et al. | 315/208 |
| 5,068,570 | 11/1991 | Oda et al. | 315/128 |
| 5,140,229 | 8/1992 | Yagi et al. | 315/307 |
| 5,142,203 | 8/1992 | Oda et al. | 315/308 |
| 5,151,631 | 9/1992 | Oda et al. | 315/127 |
| 5,177,397 | 1/1993 | Nagasawa et al. | 313/318 |
| 5,212,428 | 5/1993 | Sasaki et al. | 315/308 |
| 5,278,452 | 1/1994 | Matsumoto et al. | 307/10.8 |
| 5,295,036 | 3/1994 | Yagi et al. | 361/79 |
| 5,422,548 | 6/1995 | Yamashita et al. | 315/308 |
| 5,438,480 | 8/1995 | Yamashita | 361/760 |
| 5,449,973 | 9/1995 | Yamashita et al. | 315/82 |
| 5,485,059 | 1/1996 | Yamashita et al. | 315/307 |
| 5,486,740 | 1/1996 | Yamashita et al. | 315/308 |
| 5,514,935 | 5/1996 | Oda et al. | 315/82 |
| 5,565,743 | 10/1996 | Yamashita et al. | 315/310 |
| 5,572,094 | 11/1996 | Yamashita et al. | 315/308 |
| 5,629,588 | 5/1997 | Oda et al. | 315/308 |
| 5,663,613 | 9/1997 | Yamashita et al. | 315/308 |
| 5,705,898 | 1/1998 | Yamashita et al. | 315/308 |

Primary Examiner—Haissa Philogene
Attorney, Agent, or Firm—Sughrue, Mion, Zinn, Macpeak & Seas, PLLC

[57] ABSTRACT

A lighting circuit for a discharge lamp capable of improving the lighting performance of a discharge lamp with a simple circuit structure to thereby prevent a lighting failure at the end of the lifetime of the discharge lamp. The lighting circuit 1 comprises a DC power supply circuit 2, DC-AC conversion means 3 for converting a DC voltage output from the DC power supply circuit 2 to an AC voltage and supplying the AC voltage to the discharge lamp 5, a circuit element 6 (a switch element or a current limiting element) for blocking or limiting a current counter-flowing to the DC power supply circuit 2 from the DC-AC conversion means 3, and an inductive load 4 connected in series to the discharge lamp 5. A series circuit of a Zener diode 7 and a passive element 8 (a capacitor or a resistor) is provided in parallel to the circuit element 6, so that when the Zener diode 7 conducts, a rise in an auxiliary voltage for reignition is suppressed.

19 Claims, 7 Drawing Sheets

LIGHTING CIRCUIT FOR DISCHARGE LAMP

BACKGROUND OF THE INVENTION

1. Field of the Invention

The present invention relates to a lighting circuit capable of preventing deterioration of the lighting performance of a discharge lamp and misfiring or the like of the discharge lamp by optimizing an auxiliary voltage for reignition of the discharge lamp.

2. Description of the Related Art

Figure 12:
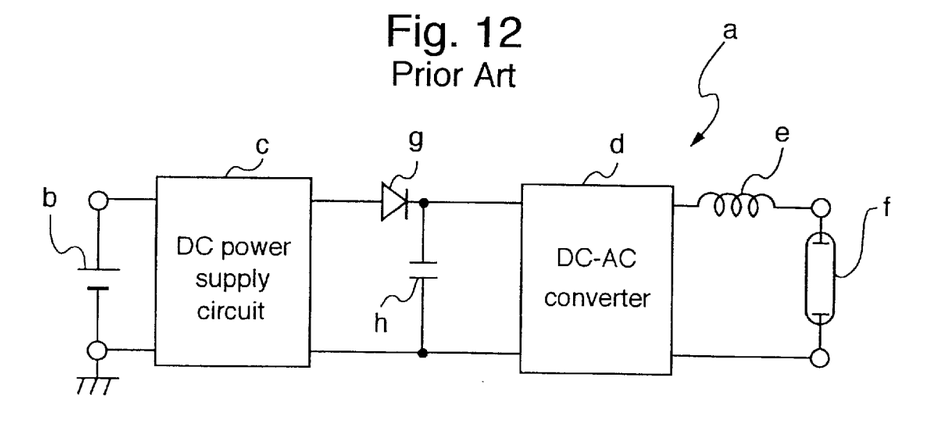
FIG. 12 is a diagram exemplifying a conventional constitution.

Recently, attention is being paid to a compact discharge lamp (a metal halide lamp or the like) as a light source for vehicular lamps. As shown in FIG. 12, for example, a known lighting circuit a is designed to include a DC power supply b, a DC power supply circuit c, and a DC-AC converter d. A DC voltage output from the DC power supply circuit c is converted by the DC-AC converter d to an AC voltage which is in turn supplied to a discharge lamp f via an inductive element e for current limitation.

To provide an auxiliary voltage for reigniting the discharge lamp f, a circuit including a diode g and a capacitor h is provided between the DC power supply circuit c and the DC-AC converter d. The diode g is so arranged to permit a current flow toward the DC-AC converter d from the DC power supply circuit c, with the capacitor h inserted between the input terminals of the DC-AC converter d at the subsequent stage of the diode g.

This lighting circuit has such a problem that while a sufficiently large auxiliary voltage for reignition is provided when a large lamp current flows at a time like the initial lighting stage of a discharge lamp, the auxiliary voltage becomes lower when a little lamp current flows as in a case where the discharge lamp is in a steady lighting state.

Specifically, since the level of the auxiliary voltage for reignition is determined by the inductance of the inductive element e, the impedance and the lamp current of the discharge lamp f and the capacitance of the capacitor h, if the auxiliary voltage is small at the time of steady lighting or the like of the discharge lamp, the ability of the lighting circuit to keep the discharge lamp on is reduced, thus impairing the lighting performance or a lighting failure of the discharge lamp may occur when the lifetime of the discharge lamp comes to an end.

Setting the capacitance of the capacitor h small to increase the auxiliary voltage at the time of steady lighting would make the auxiliary voltage at the initial lighting stage of the discharge lamp too large. This requires that the withstand voltage of the components of a peripheral circuit should be increased, resulting in a cost increase.

Accordingly, it is an object of this invention to improve the lighting performance of a discharge lamp with a simple circuit structure to thereby prevent a lighting failure at the end of the lifetime of the discharge lamp.

SUMMARY OF THE INVENTION

To achieve this object, a lighting circuit for a discharge lamp according to this invention comprises a DC power supply circuit; DC-AC conversion means for converting a DC voltage output from the DC power supply circuit to an AC voltage and supplying the AC voltage to a discharge lamp; a switch element or a current limiting element for inhibiting or limiting a current counter-flowing to the DC power supply circuit from the DC-AC conversion means; an inductive load provided in series to a discharge lamp; and a series circuit of a capacitor or a resistor and a Zener diode, provided in parallel to the switch element or the current limiting element.

According to this invention, when the Zener diode conducts, the capacitor or the resistor suppresses a rise in an auxiliary voltage for reignition.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

Figure 1:
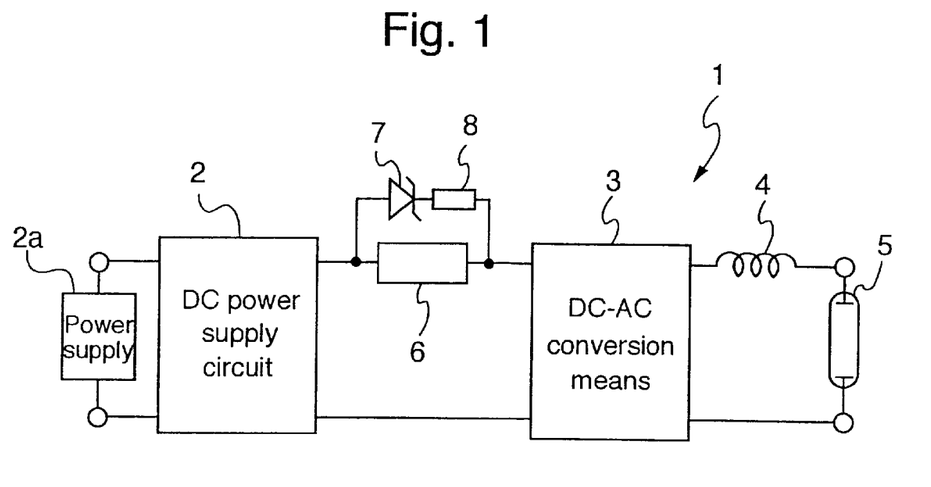
FIG. 1 is a circuit block diagram for explaining the basic constitution of a lighting circuit according to this invention.

FIG. 1 shows the basic constitution of a lighting circuit 1 according to this invention. This lighting circuit 1 comprises a DC power supply circuit 2, DC-AC conversion means 3 and an inductive load 4.

The DC power supply circuit 2 converts a voltage supplied from a power supply (DC power supply or AC power supply) 2a to a desired DC voltage, which is in turn supplied to the DC-AC conversion means 3. The DC power supply circuit 2 may take the structure of a switching power supply circuit, for example.

The DC-AC conversion means 3 is provided to convert the DC voltage output from the DC power supply circuit 2 to an AC voltage and supplies the AC voltage to the discharge lamp 5 via the inductive load 4. For example, the DC-AC conversion means 3 may be a circuit which has, for example, a plurality of 3-terminal semiconductor switch elements arranged in a pair in a bridge structure and separated into plural sets, and performs reciprocal switching control on those sets of semiconductor switch elements to output a rectangular wave.

An inductor as well as the secondary winding of a transformer which constitutes a part of an igniter circuit (or a starting circuit) generates an ignition pulse to the discharge lamp 5 can be used as the inductive load 4.

A circuit element 6 is provided on the line which connects the DC power supply circuit 2 to the DC-AC conversion means 3. As the circuit element 6 is used a switch element which blocks the current that counter-flows to the DC power supply circuit 2 from the DC-AC conversion means 3 or a current limiting element which limits the current that counter-flows to the DC power supply circuit 2 from the DC-AC conversion means 3. For example, the switch element may be a unidirectional semiconductor switch element like diode, while the current limiting element may be an inductive element (inductor or the like).

A series circuit of a Zener diode 7 and a passive element 8 (a capacitor or a resistor) is provided in parallel to the circuit element 6. The Zener diode 7 and the passive element 8 in the series circuit may take any positional relation.

Figure 2:
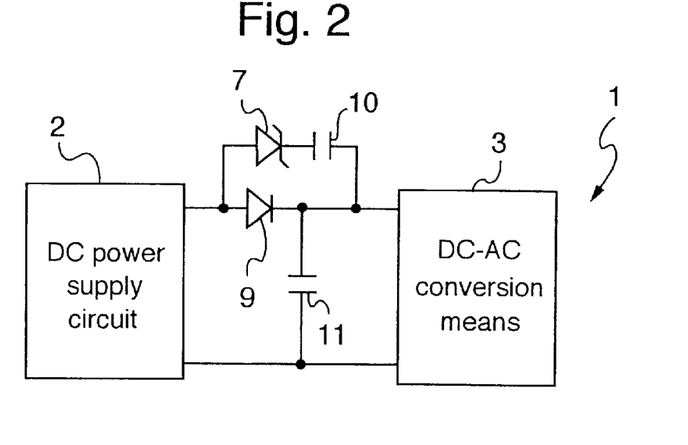
FIG. 2 is a diagram showing a constitutional example in which a switch element is a diode and a passive element is a capacitor.

FIG. 2 shows an example where a diode 9 is used as the circuit element 6 and a capacitor 10 as the passive element 8.

Specifically, the diode 9 has an anode connected to the output terminal of the DC power supply circuit 2, and a cathode connected to the input terminal of the DC-AC conversion means 3, and the Zener diode 7 has an anode connected to the anode of the diode 9 and a cathode connected to the cathode of the diode 9 via the capacitor 10.

A capacitor 11 is provided immediately after, and in parallel to, the diode 9 as one views the DC power supply circuit 2 from the DC-AC conversion means 3.

In this circuit, when the cathode potential of the diode 9 rises at the initial lighting stage or the like of the discharge lamp 5 and the anode-cathode voltage exceeds the Zener voltage of the Zener diode 7, the Zener diode 7 conducts to permit the flow of the current, thus charging the capacitor 10. This suppresses a rise in the auxiliary voltage for reignition (hereinafter referred to as "reignition auxiliary voltage"). Therefore, the capacitance of the capacitor 11 can be set small enough to acquire the proper reignition auxiliary voltage when the discharge lamp 5 is in a steady lighting state. In other words, even if the capacitance of the capacitor 11 is set small to increase the reignition auxiliary voltage while the lighting of the discharge lamp 5 is steady, the reignition auxiliary voltage does not become too large in the initial lighting stage or the like of the discharge lamp 5.

The capacitor 11 should not necessarily be provided and may be omitted in which case resonance with the inductive load 4 is carried out via the Zener diode 7 when the polarity of the supply voltage to the discharge lamp 5 is inverted.

Figure 3:
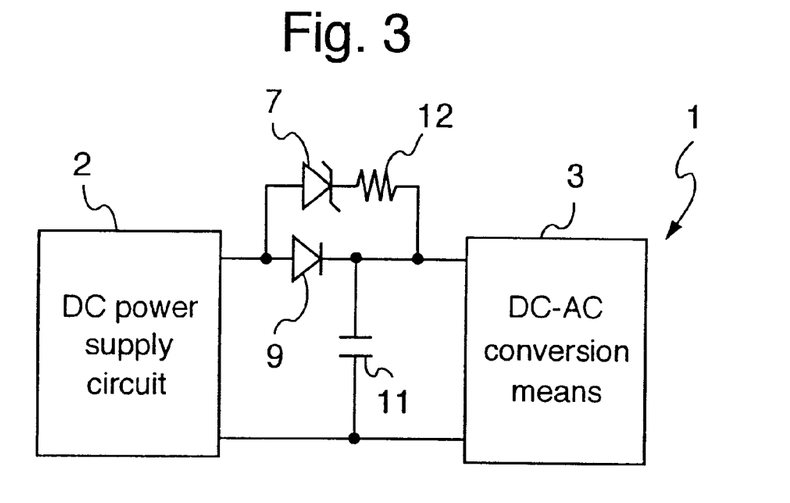
FIG. 3 is a diagram showing a constitutional example in which a switch element is a diode and a passive element is a resistor.
Figure 4:
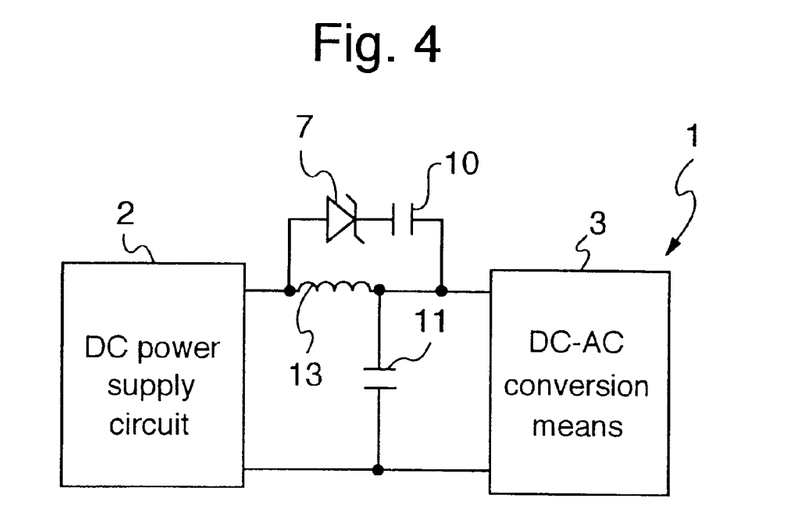
FIG. 4 is a diagram depicting a constitutional example where the diode shown in FIG. 2 is replaced with an inductor.

Although the capacitor 10 is used as the passive element 8 in FIG. 2, the capacitor 10 may be replaced with a resistor 12 as shown in FIG. 3 to restrict the rising of the reignition auxiliary voltage. While the diode 9 is used as the circuit element 6 in FIGS. 2 and 3, the diode 9 may be replaced with an inductor 13 as shown in FIG. 4.

Although the series circuit of the Zener diode 7 and the passive element 8 is provided in parallel to the circuit element 6 in the constitution shown in FIG. 1, this series circuit may be provided at the input stage of the DC-AC conversion means 3. That is, the series circuit of the capacitor 10 or the resistor 12 and the Zener diode 7 is inserted between the switch element or the current limiting element and the DC-AC conversion means 3.

Figure 5:
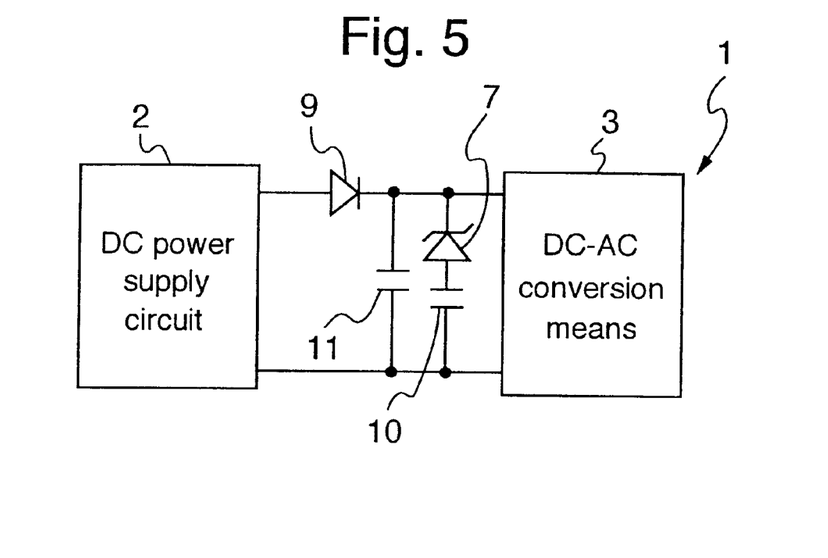
FIG. 5 is a diagram depicting a constitutional example where a series circuit of a Zener diode and a capacitor is provided at the input stage of DC-AC conversion means.

As shown in FIG. 5, for example, the diode 9 may be used as a switch element, and the capacitor 11 may be provided directly after the diode 9, with the series circuit of the Zener diode 7 and the capacitor 10 being connected in parallel to the capacitor 11. The Zener diode 7 and the capacitor 10 in the series circuit may take any positional relation.

In this circuit too, when the cathode potential of the diode 9 rises at the initial lighting stage or the like of the discharge lamp 5 and the anode-cathode voltage exceeds the Zener voltage of the Zener diode 7, the Zener diode 7 conducts to allow the current to flow, thus charging the capacitor 10. This suppresses a rise in the reignition auxiliary voltage.

Figure 6:
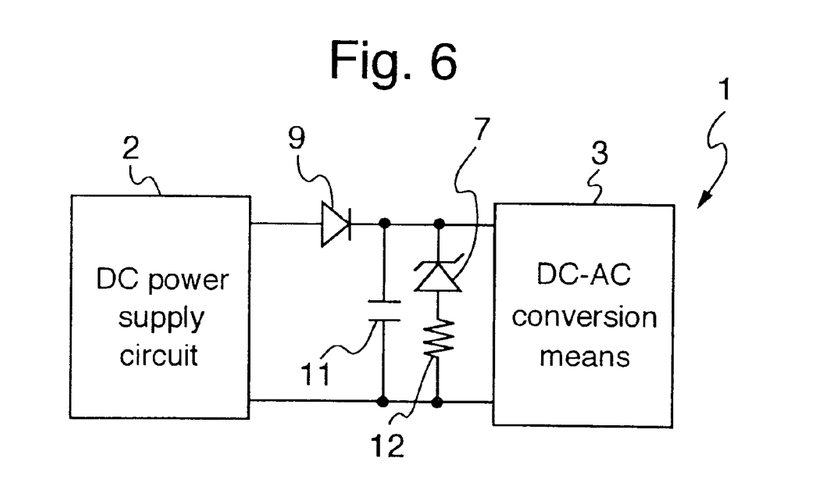
FIG. 6 is a diagram illustrating a constitutional example where a series circuit of a Zener diode and a resistor is provided at the input stage of DC-AC conversion means.
Figure 7:
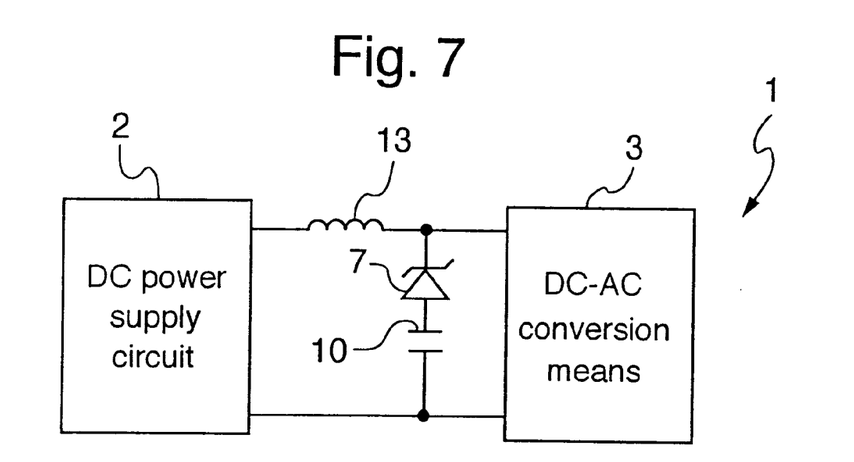
FIG. 7 is a diagram showing a constitutional example where a series circuit of a Zener diode and a capacitor is provided directly after an inductor.

The resistor 12 may be used in place of the capacitor 10 as shown in FIG. 6, or the inductor 13 may be used in place of the diode 9 as shown in FIG. 7 in which the capacitor 11 is not provided.

The use of the above-described constitution can guarantee two adequate reignition auxiliary voltages for different cases: one for the case where there is a large lamp current as in the initial lighting stage of the discharge lamp and the other needed when the discharge lamp is in a steady lighting state.

Referring to FIGS. 2 through 6, the insertion of the capacitor 11 between the switch element or the current limiting element and the DC-AC conversion means 3 can secure a sufficient reignition auxiliary voltage when the lamp current of the discharge lamp 5 is large.

Figure 8:
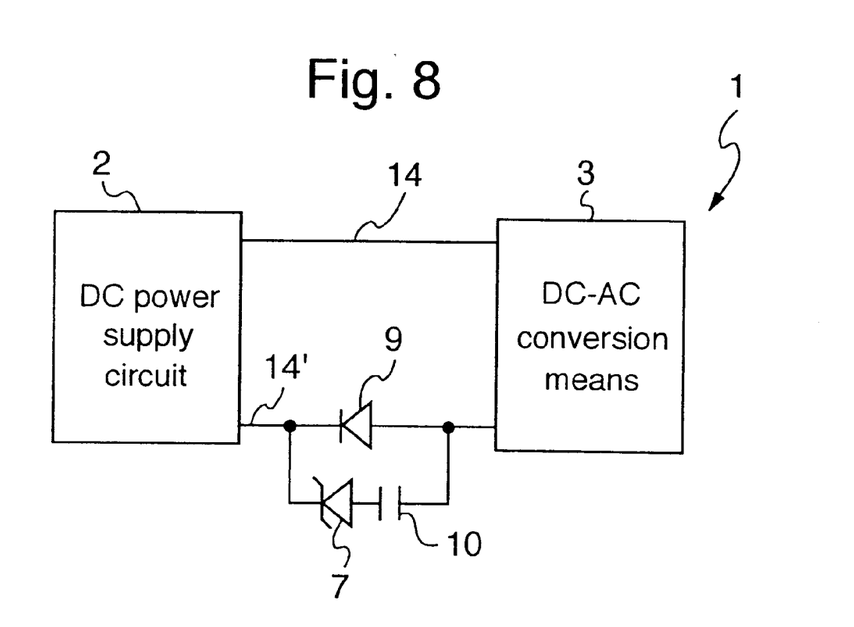
FIG. 8 is a diagram depicting a constitutional example in which a switch element and a series circuit of a Zener diode and a capacitor, provided in parallel to the switch element, are provided on a connecting line on a low voltage side.

Note that the circuit element 6, the Zener diode 7, etc. should not necessarily be provided on the high-potential one of connecting lines that connect the DC power supply circuit 2 to the DC-AC conversion means 3. As shown in FIG. 8, for example, the diode 9 may be provided on a low-potential one, 14', of connecting lines 14 and 14' that connect the DC power supply circuit 2 to the DC-AC conversion means 3, and the series circuit of the Zener diode 7 and the capacitor 10 may be connected in parallel to the diode 9. The "low-potential connecting line" is the ground line in the lighting system which supplies a positive AC voltage to a discharge lamp, or a negative line in the lighting system which supplies a negative AC voltage to a discharge lamp.

Figure 9:
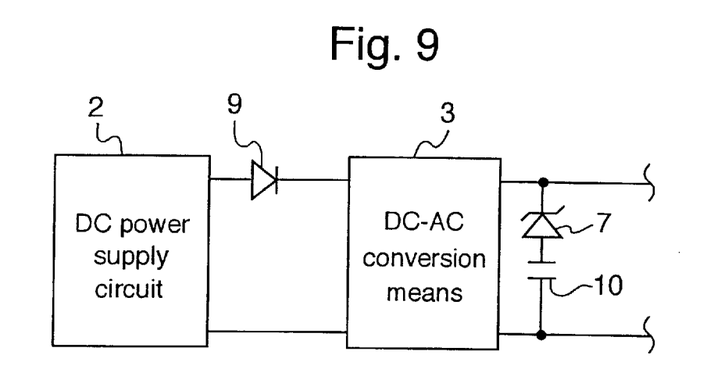
FIG. 9 is a diagram showing a constitutional example in which a series circuit of a Zener diode and a capacitor is provided at the subsequent stage of DC-AC conversion means.

The constitutions in FIGS. 5–8 in which the series circuit of the Zener diode 7 and the passive element 8 is provided at the input stage of the DC-AC conversion means 3 are no way restrictive, but may be modified in various other forms, such as the series circuit of the Zener diode 7 and the capacitor 10 being provided at the subsequent stage of the DC-AC conversion means 3 as shown in FIG. 9.

EMBODIMENT

Figure 10:
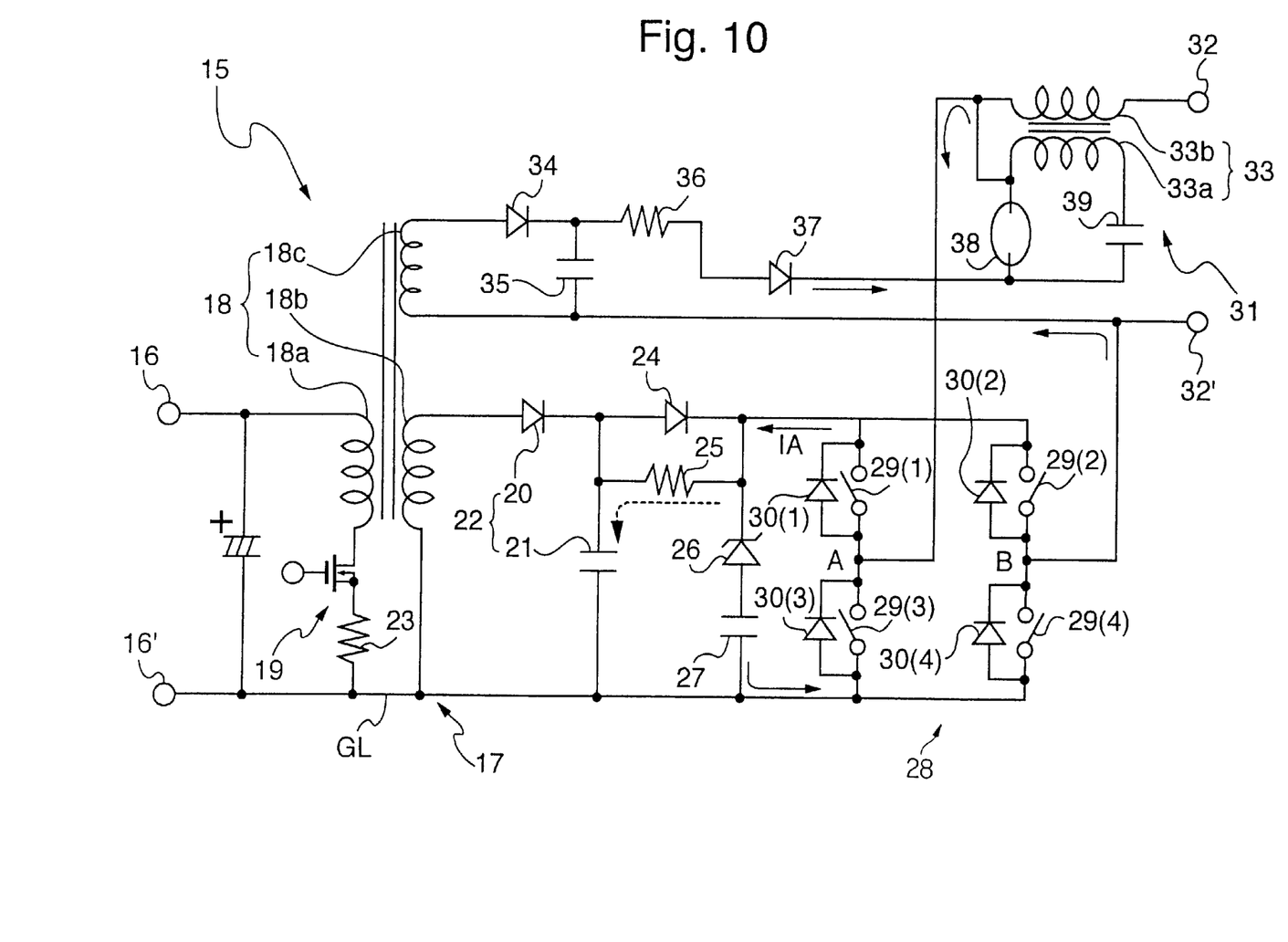
FIG. 10 is a circuit diagram illustrating an embodiment of the invention as adapted to a lighting circuit of a rectangular-wave lighting type.

FIG. 10 illustrates one embodiment of the invention as adapted to a lighting circuit of a rectangular wave lighting system.

In a lighting circuit 15, a DC voltage from an unillustrated power supply (battery or the like) is supplied to input terminals 16 and 16'. The input terminal 16 is a positive terminal and the input terminal 16' a ground terminal which is connected to a ground line GL.

A DC power supply circuit 17, which has a flyback structure for example, comprises a transformer 18, an N channel FET (Field Effect Transistor) 19, and a rectifying/smoothing circuit 22 comprised of both a diode 20 and a smoothing capacitor 21. P The primary winding, 18a, of the transformer 18 has one end connected to the input terminal 16 and the other end connected to the drain of the FET 19 whose source is connected via a resistor 23 to the ground line GL. A control signal is supplied from an unillustrated control circuit to the FET 19 to control the switching action of the FET 19.

The transformer 18 has two secondary windings 18b and 18c; the secondary winding 18b has one end connected to the anode of the diode 20 and the other end connected to the ground line GL. Provided at the subsequent stage of the diode 20 is a diode 24, equivalent to the aforementioned switch element, whose anode is connected to the cathode of the diode 20. The capacitor 21 has one end connected to the cathode of the diode 20 and the other end connected to the ground line GL.

A resistor 25 is connected in parallel to the diode 24 directly after which a series circuit of a Zener diode 26 and a capacitor 27 is provided. The Zener diode 26 has a cathode connected to the cathode of the diode 24 and an anode connected via the capacitor (equivalent to the capacitor 10) to the ground line GL.

Provided at the subsequent of the series circuit is a full-bridge type DC-AC converter 28 (equivalent to the DC-AC conversion means 3), which comprises four semiconductor switch elements 29(i) (i=1 to 4; although those elements are transistors or the like, they are simply expressed by switch symbols in FIG. 10) and damper diodes 30(i) provided to each switch element 29 (i=1 to 4 corresponding to i of the elements 29(i)). Specifically, a series circuit of the semiconductor switch elements 29(1) and 29(3) and a series circuit of the semiconductor switch elements 29(2) and 29(4) are connected in parallel, with one ends of the semiconductor switch elements 29(1) and 29(2) are connected to the cathode of the diode 24 while one ends of the semiconductor switch elements 29(3) and 29(4) are connected to the ground line GL. With the semiconductor switch elements 29(1) and 29(4) paired and the semiconductor switch elements 29(2) and 29(3) paired, the reciprocal switching control of those semiconductor switch elements is carried out in response to a control signal (polarity signal) from an unillustrated driving circuit.

The output of the DC-AC converter 28 is acquired from a node A between the semiconductor switch elements 29(1) and 29(3) and a node B between the semiconductor switch elements 29(2) and 29(4), and is supplied via an igniter circuit 31 at the subsequent stage to output terminals 32 and 32' and a discharge lamp (e.g., a metal halide lamp or the like) which is connected to those output terminals 32 and 32'. Specifically, one end of a secondary winding 33b (equivalent to the inductive load 4) of a transformer 33 which constitutes the igniter circuit 31 is connected to the node A, the other end is connected to the output terminal 32, and the output terminal 32' is connected to the node B.

The secondary winding 18c of the transformer 18 has one end connected to the anode of a diode 34, and the other end connected to the output terminal 32'. Provided at the subsequent stage of the diode 34 are a capacitor 35 and a current limiting resistor 36. The capacitor 35 has one end connected to the cathode of the diode 34 and the other end connected to the output terminal 32'.

The terminal voltage of the capacitor 35 is supplied to the primary side of the transformer 33 via the current limiting resistor 36 and a forward-bias type diode 37. Specifically, a discharge gap element 38 and a capacitor 39, connected in series to the primary winding 33a of the transformer 33, are provided on the respective ends of the primary winding 33a. Those ends of the discharge gap element 38 and the capacitor 39 which are located opposite to the primary winding 33a are connected to the cathode of the diode 37. A node between the primary winding 33a of the transformer 33 and the discharge gap element 38 is connected to the node A.

In this lighting circuit 15, the output voltage of the DC power supply circuit 17 is converted to a voltage of a rectangular wave by the DC-AC converter 28.

At the time of igniting the discharge lamp, a high voltage output from the secondary winding 18c of the transformer 18 is rectified and smoothed to charge the capacitor 39 via the diode 37. When the terminal voltage of the capacitor 39 reaches a predetermined value, the discharge gap element 38 conducts, the then generated pulse is boosted by the transformer 33 and is then superimposed on the rectangular wave voltage output from the DC-AC converter 28, and the resultant voltage is supplied to the discharge lamp through the output terminals 32 and 32'.

When there is a large lamp current as in the initial lighting stage or the like of the discharge lamp, the capacitor 27 is charged through the conduction of the Zener diode 26, thus suppressing a rise in the reignition auxiliary voltage. It is therefore possible to acquire the proper auxiliary voltage in accordance with the value of the lamp current of the discharge lamp.

When the current (IA) flows through the circuit as indicated by the arrows in FIG. 10 and flows in the counter direction to the diode 24 (i.e., in the direction from the DC-AC converter 28 toward the DC power supply circuit 17), the input/out voltage of the DC-AC converter 28 becomes larger than expected, so that the withstand voltages of the constituting elements should be increased. In other words, if the diode 24 and the resistor 25 were not present in FIG. 10 (if the diode 24 were replaced with a line and the resistor 25 were omitted), the current IA would flow through the smoothing capacitor 21 of a relatively large capacitance so that the auxiliary voltage would not become large. The provision of the diode 24 however blocks the current IA, making it necessary to cope with an increased auxiliary voltage.

As a solution, the resistor 25 is connected in parallel to the diode 24 and the resistance of the resistor 25 is set sufficiently smaller than the resistance of the current limiting resistor 36 to thereby form the current path to the capacitor 21 as indicated by the broken line in FIG. 10. This can avoid the necessity to increase the withstand voltages of the constituting elements.

Figure 11:
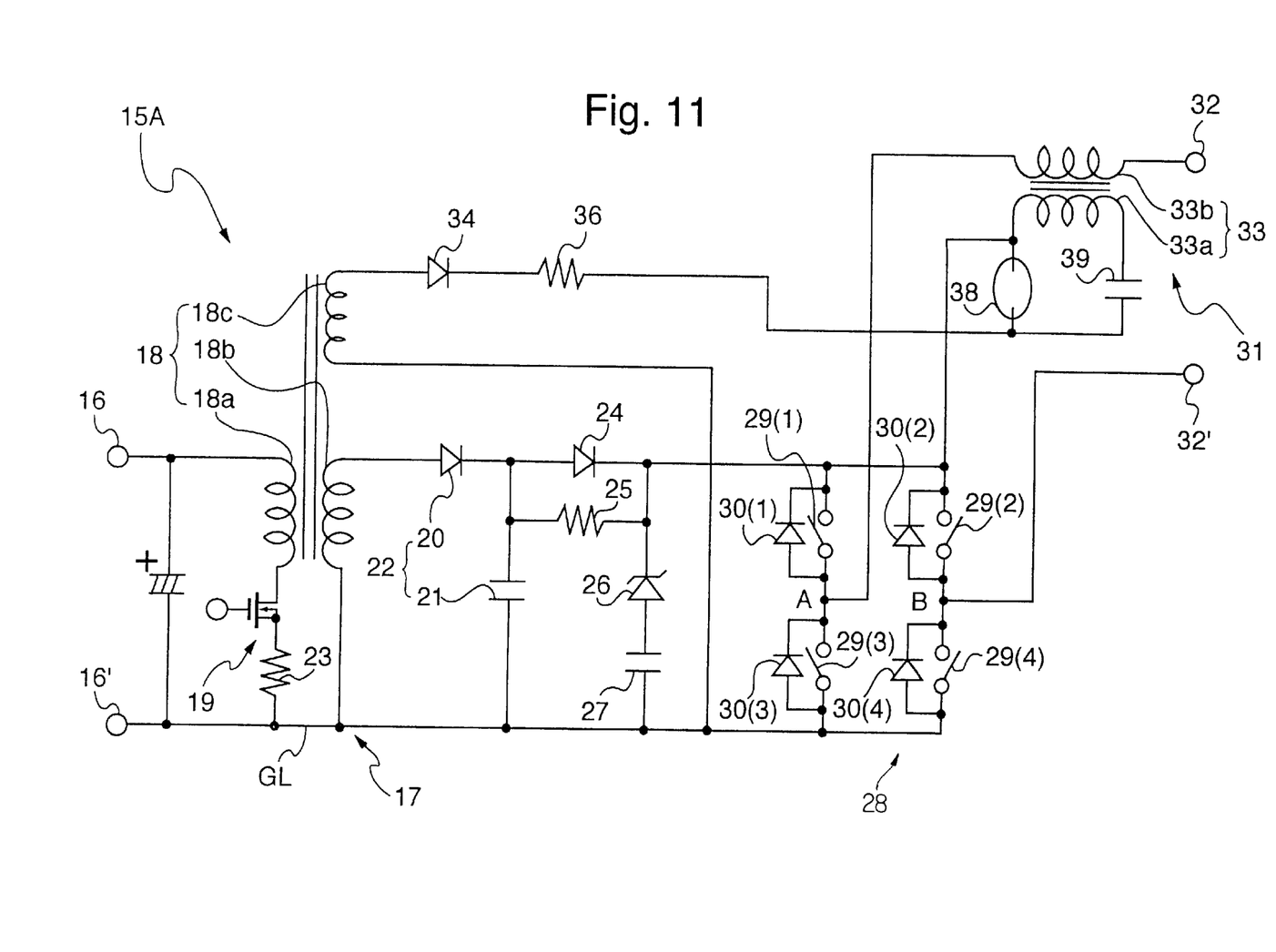
FIG. 11 is a circuit diagram exemplifying a constitution different from the one in FIG. 10.

The constitution shown in FIG. 10 allows the capacitor 35 to smooth the output of the secondary winding 18c of the transformer 18 and then sends the smoothed output to the igniter circuit 31. If such smoothing is unnecessary, the lighting circuit may take a constitution (15A) as shown in FIG. 11. In FIG. 11, one end of the secondary winding 18c of the transformer 18 is connected to one ends of the discharge gap element 38 and the capacitor 39 via the diode 34 and the current limiting element 36, and the other end of the secondary winding 18c is connected to the ground line GL at the input stage of the DC-AC converter 28. The node between the primary winding 33a of the transformer 33 and the discharge gap element 38 is connected to that end of the semiconductor switch element 29(1) which is opposite to the node B, which is connected to the output terminal 32'.

According to this invention, as apparent from the foregoing description, at the time the Zener diode conducts, the capacitor or resistor suppresses a more-than-necessary rise in the reignition auxiliary voltage, so that the adequate reignition auxiliary voltage can be obtained in both cases of a large lamp current and a small lamp current. This improves the lighting performance of a discharge lamp and can prevent a lighting failure at the end of the lifetime of the discharge lamp. As this advantage can be provided by merely adding a Zener diode and a capacitor or a resistor and thus without complicating the circuit structure.

According to one modification of the invention, a capacitor is inserted between the switch element or the current limiting element and the DC-AC conversion means, guaranteeing a sufficient reignition auxiliary voltage when a discharge lamp has a large lamp current.

It should be apparent to those skilled in the art that the present invention may be embodied in many other specific forms without departing from the spirit or scope of the invention. Therefore, the present examples and embodiment are to be considered as illustrative and not restrictive and the invention is not to be limited to the details given herein, but may be modified within the scope and equivalence of the appended claims.

What is claimed is:

1. A lighting circuit for a discharge lamp comprising:
   a DC power supply circuit;
   DC-AC conversion means for converting a DC voltage output from said DC power supply circuit to an AC voltage and supplying said AC voltage to the discharge lamp;
   a switch element or a current limiting element for blocking or limiting a current counter-flowing to said DC power supply circuit from said DC-AC conversion means;
   an inductive load provided in series to the discharge lamp; and
   a series circuit of a capacitor or a resistor and a Zener diode, provided in parallel to said switch element or said current limiting element.

2. The lighting circuit according to claim 1, wherein a capacitor is inserted between said switch element or said current limiting element and said DC-AC conversion means.

3. The lighting circuit according to claim 1, wherein said inductive load is an inductor.

4. The lighting circuit according to claim 1, wherein said inductive load is a secondary winding of a transformer constituting an igniter circuit for igniting said discharge lamp.

5. The lighting circuit according to claim 1, wherein said switch element is a semiconductor switch element.

6. The lighting circuit according to claim 1, wherein said current limiting element is an inductance element.

7. A lighting circuit for a discharge lamp comprising:
   a DC power supply circuit;
   DC-AC conversion means for converting a DC voltage output from said DC power supply circuit to an AC voltage and supplying said AC voltage to the discharge lamp;
   a switch element or a current limiting element for blocking or limiting a current counter-flowing to said DC power supply circuit from said DC-AC conversion means;
   an inductive load provided in series to the discharge lamp; and
   a series circuit of a capacitor or a resistor and a Zener diode, inserted between said switch element or said current limiting element and said DC-AC conversion means.

8. The lighting circuit according to claim 7, wherein a capacitor is inserted between said switch element or said current limiting element and said DC-AC conversion means.

9. The lighting circuit according to claim 7, wherein said inductive load is an inductor.

10. The lighting circuit according to claim 7, wherein said inductive load is a secondary winding of a transformer constituting an igniter circuit for igniting said discharge lamp.

11. The lighting circuit according to claim 7, wherein said switch element is a semiconductor switch element.

12. The lighting circuit according to claim 7, wherein said current limiting element is an inductance element.

13. The lighting circuit according to claim 7, wherein said series circuit is provided in parallel to said DC-AC conversion means.

14. A lighting circuit for a discharge lamp comprising:
    a DC power supply circuit;
    DC-AC conversion means for converting a DC voltage output from said DC power supply circuit to an AC voltage and supplying said AC voltage to the discharge lamp;
    a switch element or a current limiting element for blocking or limiting a current counter-flowing to said DC power supply circuit from said DC-AC conversion means;
    an inductive load provided in series to the discharge lamp; and
    a series circuit of a capacitor or a resistor and a Zener diode, provided at a subsequent stage of said DC-AC conversion means.

15. The lighting circuit according to claim 14, wherein said inductive load is an inductor.

16. The lighting circuit according to claim 14, wherein said inductive load is a secondary winding of a transformer constituting an igniter circuit for igniting said discharge lamp.

17. The lighting circuit according to claim 14, wherein said switch element is a semiconductor switch element.

18. The lighting circuit according to claim 14, wherein said current limiting element is an inductance element.

19. The lighting circuit according to claim 14, wherein said series circuit is provided in parallel to said DC-AC conversion means.

* * * * *